(12) United States Patent
Hirata et al.

(10) Patent No.: US 6,388,038 B1
(45) Date of Patent: May 14, 2002

(54) METHOD FOR PRODUCING POLYCARBOXYLIC ACID FOR CEMENT DISPERSANT AND CEMENT COMPOSITION

(75) Inventors: Tsuyoshi Hirata, Kobe; Tsutomu Yuasa, Osaka; Katsuhisa Shiote, Yokohama; Koichiro Nagare, Suita; Syogo Iwai, Kawasaki, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/724,009

(22) Filed: Nov. 28, 2000

Related U.S. Application Data

(63) Continuation of application No. 08/991,285, filed on Dec. 16, 1997, now Pat. No. 6,174,980.

(30) Foreign Application Priority Data

Dec. 26, 1996 (JP) .............................................. 8-348201

(51) Int. Cl.[7] .............................................. C08F 222/10
(52) U.S. Cl. ................. 526/320; 525/329.7; 525/330.1; 525/330.3; 525/330.6; 526/328; 526/328.5; 526/333; 526/932
(58) Field of Search ........................... 525/330.1, 329.7, 525/330.3, 330.6; 526/320, 333, 932

(56) References Cited

U.S. PATENT DOCUMENTS

| | | |
|---|---|---|
| 3,056,764 A | 10/1962 | Graham et al. |
| 3,880,765 A | 4/1975 | Watson |
| 5,336,728 A | 8/1994 | Humphries et al. |
| 5,476,885 A | 12/1995 | Tahara et al. |
| 5,614,017 A | 3/1997 | Shawl |

FOREIGN PATENT DOCUMENTS

| | | |
|---|---|---|
| EP | 0 056 627 A2 | 7/1982 |
| EP | 0 350 904 A2 | 1/1990 |
| EP | 0 373 621 A2 | 6/1990 |
| EP | 0 448 717 A1 | 10/1991 |
| EP | 0 747 331 A1 | 12/1996 |
| GB | 1 411 843 | 10/1975 |
| JP | 58-37027 | 3/1983 |
| JP | 8-165156 | 6/1996 |
| WO | 95/16643 | * 6/1995 |

OTHER PUBLICATIONS

Lee, H. et al., Handbook of Epoxy Resins, (1967), 5–32, [7], McGraw–Hill, (New York).*

March, J., "Advanced Organic Chemistry—Reactions, Mechanisms, and Structure", (1992), 391 and 393–398, Wiley,(New York).*

* cited by examiner

Primary Examiner—Fred Zitomer

(57) ABSTRACT

The present invention provides a method for producing a cement dispersant having high percentage in water reduction rate and appropriate air-entraining property. This method for producing a polycarboxylic acid for a cement dispersant is characterized in that alkylene oxide is added at a specific temperature range.

3 Claims, 3 Drawing Sheets

METHOD FOR PRODUCING POLYCARBOXYLIC ACID FOR CEMENT DISPERSANT AND CEMENT COMPOSITION

This application is a continuation of 35 U.S.C. §120 of U.S. patent application Ser. No. 08/991,285 filed Dec. 16, 1997 now U.S. Pat. No. 6,174,980.

BACKGROUND OF THE INVENTION

A. Technical Field

The present invention relates to a cement dispersant, a method for producing a polycarboxylic acid for a cement dispersant and a cement composition. More specifically, it relates to a cement dispersant synthesized by using a polyalkylene glycol ester type monomer or a polyalkylene glycol ether type monomer, having alkylene oxide obtained by the addition reaction in a specific temperature range, and a cement dispersant which can achieve high percentage in water reduction, a method for producing a polycarboxylic acid for such a cement dispersant and a cement composition.

B. Background Art

In recent concrete fields, improvement in durability and strength of concrete structures is strongly demanded. Reduction in unit water amount is an important subject, and development of high performance AE water reducing agents is energetically conducted in each cement admixture maker. Of those, polycarboxylic acid type high performance AE water reducing agents have the excellent characteristic which exhibits extremely high water reducing property which cannot be achieved by other high performance AE water reducing agents such as naphthalene type. However, the water reducing performance is not still sufficient.

SUMMARY OF THE INVENTION

A. Objects of the Invention

An object of the present invention is to provide a cement dispersant which improves water reducing performance, a method for producing a cement dispersant and a cement composition.

B. Disclosure of the Invention

The present inventors have found that a polycarboxylic acid for a cement dispersion, obtained by a specific production method is an excellent cement dispersion exhibiting high water reducing performance, and have completed the present invention. That is, the present invention is to provide a cement dispersant exhibiting high to water reducing performance, a method for producing a polycarboxylic acid for a cement dispersant and a cement composition.

The above various objects are achieved by (1) a cement dispersant containing a polycarboxylic acid having a polyalkylene glycol at a side chain, wherein the polyalkylene glycol is obtained by adding alkylene oxide in a range of 80 to 155° C.

The present invention is also achieved by (2) a cement dispersant comprising a polycarboxylic acid having a polyalkylene glycol at a side chain, wherein the polycarboxylic acid comprises a polyalkylene glycol type monomer unit having a polyalkylene glycol at a side chain and a carboxylic acid type monomer unit, characterized in that, as a polyalkylene glycol type monomer giving the polyalkylene glycol type monomer unit, a polyalkylene glycol type monomer having a molecular weight distribution which has a main peak, belt has no second peak on the higher molecular weight side of the main peak, or has a second peak on the higher molecular weight side of the main peak in an area ratio of 8% or less based on the total area of the main peak and the second peak.

The present invention is also achieved by (3) a method for producing a polycarboxylic acid for a cement dispersant, having a polyalkylene glycol at a side chain, characterized by adding alkylene oxide to an active hydrogen-containing compound in a range of 80 to 155° C.

Further, the present invention is achieved by (4) a method for producing a polycarboxylic acid for a cement dispersant comprising, as repeating units, a polyalkylene glycol ether type unit (I) represented by the general formula (1)

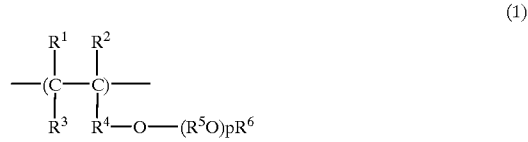

(where, $R^1$ to $R^3$ each independently represent hydrogen or methyl group, $R^5O$ represents one kind or a mixture of two or more kinds of oxyalkylene group having 2 to 4 carbon atoms, in the case of two or more kinds, those may be added in a block state or random state, $R^6$ represents hydrogen, alkyl group having 1 to 22 carbon atoms, phenyl group, or alkyl phenyl group (the alkyl group in the alkyl phenyl group having 1 to 22 carbon atoms), $R^4$ represents —$CH_2$—, —$(CH_2)_2$— or —$C(CH_3)_2$—, and p represents an integer of 1 to 300), and a dicarboxylic acid type unit (II) represented by the general formula (2)

(where, $M^1$ and $M^2$ each independently represent hydrogen, monovalent metal, divalent metal, ammonium or organic amine, X represents —$OM^2$, or —Y—$(R^7O)rR^8$, Y represents —O—, or —NH—, $R^7O$ represents one kind or a mixture of two or more kinds of oxyalkylene group having 2 to 4 carbon atoms, in the case of two or more kinds, those may be added in a block state or a random state, $R^8$ represents hydrogen, alkyl group having 1 to 22 carbon atoms, phenyl group, aminoalkyl group, alkyl phenyl group, or hydroxyalkyl group (each alkyl group in the aminoalkyl, alkyl phenyl and hydroxyalkyl groups having 1 to 22 carbon atoms), r is an integer of 0 to 300, and an acid anhydride group (—CO—O—CO—) may be formed in place of the —$COOM^1$ and COX groups between carbon atoms to which the —$COOM^1$ and COX groups should be bonded respectively), characterized in that a polyalkylene glycol ether type monomer obtained by addition reaction of alkylene oxide having 2 to 4 carbon atoms in a range of 80 to 155° C. with an unsaturated alcohol (B-1) represented by general formula (3)

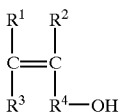

(where, $R^1$ to $R^3$ each independently represent hydrogen, or methyl group, and $R^4$ represents —$CH_2$—, —$(CH_2)_2$—, or —$C(CH_3)_2$—) is used as a polyalkylene glycol ether type monomer giving the general formula (1) which is the repeating unit.

Furthermore, the present invention is achieved by (5) a method for producing a polycarboxylic acid for a cement dispersion, wherein the polycarboxylic acid comprises, as repeating units, a polyalkylene glycol ester type unit (III) represented by the general formula (4)

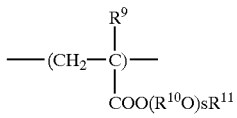

(where, $R^9$ represents hydrogen, or methyl group, $R^{10}O$ represents one kind or a mixture of two or more kinds of oxyalkylene group having 2 to 4 carbon atoms, in the case of two or more kinds, those may be added in a block state or random state, $R^{11}$ represents alkyl group having 1 to 22 carbon atoms, phenyl group, or alkyl phenyl group (the alkyl group in the alkyl phenyl group having 1 to 22 carbon atoms), and s is an integer of 1 to 300), and a monocarboxylic acid type unit (IV) represented by the general formula (5)

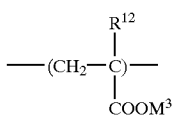

(where, $R^{12}$ represents hydrogen, or methyl group, and $M^3$ represents hydrogen, monovalent metal, divalent metal, ammonium, or organic amine), characterized in that a polyalkylene glycol (6) obtained by addition reaction of alkylene oxide having 2 to 4 carbon atoms with an alcohol (B-2) represented by the general formula (7) in a range of 80 to 155° C. is used in producing a polyalkylene glycol ester type monomer giving the repeating unit (III) by esterification between the polyalkylene glycol (6) represented by the general formula (6)and (meth)acrylic acid or ester interchange between the polyalkylene glycol (6) and alkyl(meth) acrylates (the alkyl group in the alkyl(meth)acrylates having 1 to 22 carbon atoms).

HO—($R^{10}O$)s—$R^{11}$ (6)

(where, $R^{10}O$ represents one kind or a mixture of two or more kinds of oxyalkylene group having 2 to 4 carbon atoms, in the case of two or more, those may be added in a block state or random state, $R^{11}$ represents alkyl group having 1 to 22 carbon atoms, phenyl group, or alkyl phenyl group (the alkyl group in the alkyl phenyl group having 1 to 22 carbon atoms), and s is an integer of 1 to 300)

HO—$R^{11}$ (7)

(where, $R^{11}$ represents alkyl group having 1 to 22 carbon atoms, phenyl group, or alkyl phenyl group (the alkyl group in the alkyl phenyl group having 1 to 22 carbon atoms))

Furthermore, the present invention is achieved by (6) a method for producing a polycarboxylic acid for a cement dispersant as shown in (3), (4) or (5) above, characterized in that the addition reaction of the alkylene oxide is conducted in the presence of a base catalyst.

Furthermore, the present invention is achieved by (7) a cement dispersant comprising a polycarboxylic acid for cement dispersant obtained by the method as shown in (3), (4), (5) or (6) above.

Furthermore, the present invention is achieved by (8) a cement composition comprising at least water, a cement and a cement dispersant, characterized in that as the cement dispersant the cement composition comprises the cement dispersant as shown in (1), (2) or (7) above.

DETAILED DESCRIPTION OF THE INVENTION

Figure 1:
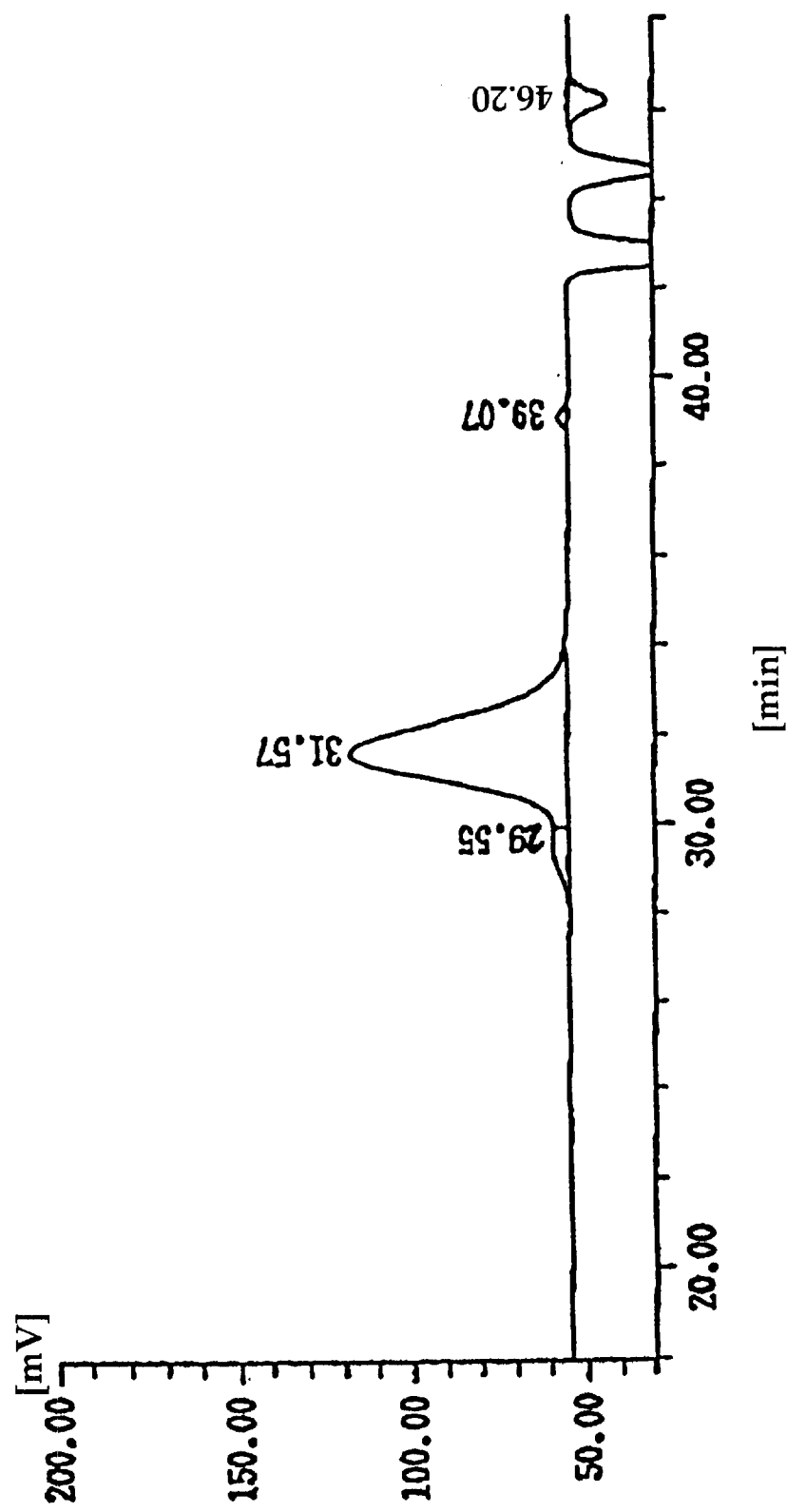
FIG. 1 shows a GPC chart of 'IPN-35' as produced in Example 1.

As a polycarboxylic acid having a polyalkylene glycol at a side chain obtained by adding alkylene oxide to an active hidrogen containing compound, there are exemplified a polycarboxylic acid comprising the repeating units (I) and (II) and a polycarboxylic acid comprising the repeating units (III) and (IV).

The repeating unit (I) is one shown by the above general formula (1). Examples of a monomer giving such a repeating unit are compounds obtained by adding 1 to 300 moles of alkylene oxide to an unsaturated alcohol, such as allyl alcohol, methallyl alcohol, 3-methyl-3-butene-1-ol, 3-methyl-2-butene-1-ol, or 2-methyl-3-butene-2-ol. Those are used in one kind or two or more kinds.

In order to obtain high water reducing performance, it is important to disperse cement particles with steric repulsion and hydrophilicity due to polyalkylene glycol chain contained in the repeating units (I) and (III). For this, it is preferable that many oxyethylene groups are introduced into the polyalkylene glycol chain. Further, it is most preferable to use the polyalkylene glycol chain in which an average addition mole number of the oxyalkylene group is 1 to 300, but polyalkylene glycols having the average addition mole number of 1 to 100, or 5 to 100 are proper from the point of polymerizability and hydrophilicity.

The repeating unit (II) is one shown by the above general formula (2). Examples of monomers giving the repeating unit (II) are maleic acid, maleic anhydride, half-ester of maleic acid and alcohol having 1 to 22 carbon atoms, half-amide of maleic acid and amine having 1 to 22 carbon atoms, half-amide or half-ester of maleic acid and amino alcohol having 1 to 22 carbon atoms, half-ester of a compound (C) obtained by adding 1 to 300 moles of oxyalkelene having 2 to 4 carbon atoms to those alcohols and maleic acid, half-amide of a compound in which hydroxyl group at one end of the compound (C) is aminated and maleic acid, half-ester of maleic acid and glycol having 2 to 4 carbon atoms, or polyalkylene glycol in which the addition mole number of those glycols is 2 to 100, half-amide of maleamic acid and glycol having 2 to 4 carbon atoms, or polyalkylene glycol in which the addition mole number of those glycols is 2 to 100, and their monovalent metal salts, divalent metal salts, ammonium salts, and organic amine salts, and the like. Those can be used in one kind or two or more kinds.

The repeating unit (III) is one shown by the above general formula (4). Examples of the monomer giving the repeating unit (III) are esterified products of alkoxypolyalkylene glycol and (meth)acrylic acid, such as methoxypolyethylene glycol mono(meth)acrylate, methoxypolypropylene glycol mono(meth)acrylate, methoxypolyethylene glycol polypropylene glycol mono(meth)acrylate, methoxypolybutylene glycol mono(meth)acrylate, or methoxypolyethylene glycol polybutylene glycol mono(meth)acrylate. Those can be used in one kind or two or more kinds.

In order to obtain high water reducing performance, it is important to disperse cement particles with steric repulsion and hydrophilicity due to polyalkylene glycol chain contained in the repeating unit (III). For this, it is preferable that many oxyethylene groups are introduced into the polyalkylene glycol chain. Further, it is most preferable to use the polyalkylene glycol chain in which an average addition mole number of the oxyalkylene group is 1 to 300, but polyalkylene glycols having the average addition mole number of 1 to 100, or 5 to 100 are proper from the point of polymerizability and hydrophilicity.

The repeating unit (IV) is one shown by the above general formula (5). Examples of the monomer giving the repeating unit (IV) are (meth)acrylic acid, and their monovalent metal salts, divalent metal salts, ammonium salts, and organic amine salts. Those can be used in one kind or two or more kinds.

If necessary, a repeating unit (V) other than the repeating units (I) and (II) can be introduced. Examples of the monomers giving the repeating unit (V) are unsaturated dicarboxylic acids, such as fumaric acid, itaconic acid, or citraconic acid, and their monovalent metal salts, divalent metal salts, ammonium salts, and organic amine salts, and monoesters or diesters of those acids and alkyl alcohol having 1 to 20 carbon atoms and glycol having 2 to 4 carbon atoms or polyalkylene glycol having addition mole number of their glycols of 2 to 100; diesters of maleic acid and alkyl alcohol having 1 to 20 carbon atoms or glycol having 2 to 4 carbon atoms or polyalkylene glycol having addition mole number of their glycols of 2 to 100; (meth)acrylic acid and their monovalent metal salts, divalent metal salts, ammonium salts, organic amine salts, and esters of those acids and alkyl alcohol having 1 to 20 carbon atoms and glycol having 2 to 4 carbon atoms or polyalkylene glycol having addition mole number of their glycols of 2 to 100; unsaturated sulfonic acids, such as sulfoethyl (meth)acrylate, 2-methyl propanesulfonic acid (meth)acylamide, or styrenesulfonic acid, and their monovalent metal salt, divalent metal salts, ammonium salts and organic amine salts; unsaturated amides, such as (meth)acrylamide or (meth)acrylalkyl amide; vinyl esters, such as vinyl acetate or vinyl propionate; aromatic vinyls, such as styrene; and the like. Those can be used in one kind or two or more kinds.

If necessary, a repeating unit (VI) other than the repeating units (III) and (IV) can be introduced. Examples of the monomers giving the repeating unit (VI) are unsaturated dicarboxylic acids, such as maleic acid, fumaric acid, itaconic acid, or citraconic acid, and their monovalent metal salts, divalent metal salts, ammonium salts, and organic amine salts, and monoesters or diesters of those acids and alkyl alcohol having 1 to 20 carbon atoms and glycol having 2 to 4 carbon atoms or polyalkylene glycol having addition mole number of their glycols of 2 to 100; (meth)acrylic acid., and their monovalent metal salts, divalent metal salts, ammonium salts, and organic amine salts, and esters of those acids and alkyl alcohol having 1 to 20 carbon atoms and glycol having 2 to 4 carbon atoms or polyalkylene glycol having addition mole number of their glycols of 2 to 100; unsaturated sulfonic acids, such as sulfoethyl (meth)acrylate, 2-methyl propanesulfonic acid (meth)acrylamide, or styrenesulfonic acid, and their monovalent metal salt, divalent metal salts, ammonium salts and organic amine salts; unsaturated amides, such as (meth)acrylamide, or (meth)acrylalkyl amide; vinyl esters, such as vinyl acetate or vinyl propionate; aromatic vinyls, such as styrene; and the like. Those can be used in one kind or two or more kinds.

The monomer giving the repeating unit (I) can be produced by addition reaction of the unsaturated alcohol (B-1), which is an active hydrogen containing compound, and the alkylene oxide having 2 to 4 carbon atoms, and the monomer giving the repeating unit (III) is obtained by esterification between the polyalkylene glycol (6) obtained by addition reaction of the alcohol (B-2), which is an active hydrogen containing compound, and the alkylene oxide having 2 to 4 carbon atoms and (meth)acrylic acid or ester interchange between the polyalkylene glycol (6) and alkyl(meth)acrylates.

Examples of such alkyl(meth)acrylates are methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, hexyl (meth)acrylate, heptyl (meth)acrylate, and the like. Those can be used in one kind or two or more kinds.

The unsaturated alcohol (B-1) is one shown by the general formula (3). Examples of the unsaturated alcohol (B-1) are unsaturated alcohols, such as allyl alcohol, methallyl alcohol, 3-methyl-3-butene-1-ol, 3-methyl-2-butene-1-ol, or 2-methyl-3-butene-2-ol. Those can be used in one kind or two or more kinds.

The polyalkylene glycol (6) is one shown by the above general formula (6). Examples thereof are methoxypolyethylene glycol, methoxypolypropylene glycol, methoxypolyethylene glycol polypropylene glycol, methoxypolybutylene glycol, and the like. Those can be used in one kind or two or more kinds.

The alcohol (B-2) is one shown by the above general formula (7). Examples thereof are methyl alcohol, ethyl alcohol, propyl alcohol, butanol, pentanol, isobutanol, isopropanol, phenol, and the like. Those can be used in one kind or two or more kinds.

Examples of the alkylene oxide having 2 to 4 carbon atoms are ethyleneoxide, propyleneoxide, or butyleneoxide and the like. Those can be used in one kind or two or more kinds.

The addition temperature in addition reaction of the unsaturated alcohol (B-1) and the alkylene oxide having 2 to 4 carbon atoms and in addition reaction of the alcohol (B-2) and the alkylene oxide having 2 to 4 carbon atoms must be within the range of 80 to 155° C., preferably within the range of 90 to 150° C., or more preferably within the range of 100 to 140° C. That is, in the polycarboxylic acid of the present invention which comprises the repeating units (I) and (II), and in the polycarboxylic acid of the present invention which comprises the repeating units (III) and (IV), in a copolymer obtained using a monomer obtained by addition reaction at high temperature of more than 155° C., copolymerizability of the monomer is low, and the weight average molecular weight does not freely rise to the desired value. As a result, in the case of using as a cement dispersant, excessive addition amount is necessary, resulting in high cost, the water reducing performance is low, and the slump loss preventing effect is low. In contrast to this, if the temperature is lower than 80° C., addition rate is slow, and productivity decreases. Thus, the reason that the addition reaction temperature has the optimum range as the performance of a cement dispersant is unclear, but it is a surprising matter.

As the polyalkylene glycol type monomer (such as a polyalkylene glycol ether type monomer obtained by adding the alkyleneoxide to the unsaturated alcohol (B-1), a polyalkylene glycol ester type monomer obtained by esterification between a polyalkylene glycol and (meth)acrylic acid wherein the polyalkylene glycol obtained by addition reaction of the alkylene oxide to the alcohol (B-2), or a polyalkylene glycol ester type monomer obtained to by ester interchange between the polyalkylene glycol and alkyl (meth)acrylates) giving such a polyalkylene glycol ether type unit (such as the polyalkylene glycol ether type unit being the repeating unit (I) and the polyalkylene glycol ester type unit being the repeating unit (III)) of the polycarboxylic acid of the present invention, there can be used, for example, a monomer having a molecular weight distribution which has a main peak, but has no second peak on the higher molecular weight side of the main peak, or has a second peak on the higher molecular weight side of the main peak in an area ratio of 8% or less, preferably 6% or less, based on the total area of the main peak and the second peak. The second peak on the higher molecular weight side of the main peak seems to be caused by, for example, that partial polymerization occurs to form olygomers or other substances when adding the alkylene oxide to the active hydrogen containing compound. As the addition temperature becomes higher, the area ratio of the second peak on the higher molecular weight side of the main peak increases, and at last, when the addition temperature has gone over 155° C., the area ratio exceeds 8%. As a result, the molecular weight becomes difficult to increase in the copolymerization with the carboxylic acid type monomer, so the above-mentioned disadvantage appears. Shapes of the second peak on the higher molecular weight side of the main peak is not limited to a peak independent of the main peak, but includes those such as a peak partially overlapping with the main peak or a shoulder-shaped peak forming a shoulder of the main peak.

To obtain the polycarboxylic acid for a cement dispersant of the present invention, the above-mentioned monomers are copolymerized with a polymerization initiator. The polycarboxylic acid for a cement dispersant can be produced by conventional methods, such as solution polymerization or bulk polymerization.

The solution polymerization can be conducted in a batchwise or continuous manner. A solvent used in such a case is water; alcohols, such as methyl alcohol, ethyl alcohol, or isopropyl alcohol; aromatic or aliphatic hydrocarbons, such as benzene, toluene, xylene, cyclohexane, or n-hexane; ester compounds, such as ethyl acetate; ketone compounds, such as acetone or methyl ethyl ketone; and the like. It is preferable to use at least one kind selected from the group consisting of water and lower alcohols having 1 to 4 carbon atoms, from solubility of the raw material monomer and the polycarboxylic acid for a cement dispersant obtained. Of those, it is further preferable to use water as a solvent from the point that desolvent step can be omitted. In a case that maleic anhydride is used for copolymerization, polymerization using an organic solvent is preferable.

In the case of conducting an aqueous solution polymerization, water-soluble polymerization initiators, such as persulfuric acid salts of ammonia or alkali metals; hydrogen peroxide; azoamidine compounds, such as azobis-2-methylpropione amidine hydrochloride; and the like are used as the polymerization initiator. In this case, an accelerator, such as sodium hydrogen sulfite or Mohr's salt can be used together.

Further, in the solution polymerization using lower alcohols, aromatic or aliphatic hydrocarbons, ester compounds, or ketone compounds as a solvent, peroxides, such as benzoyl peroxide or lauroyl peroxide; hydroperoxides, such as cumene hydroperoxide; azo compounds such as to azobisisobutyronitrile; and the like are used as a polymerization initiator. In this case, an accelerator such as amine compounds can be used together. Furthermore, in the case of using water-lower alcohol mixed solvent, it is possible to use by appropriately selecting from the above-mentioned various polymerization initiators or combination of the polymerization initiators and accelerators.

The bulk polymerization is conducted within the temperature range of 50 to 200° C. using peroxides, such as benzoyl peroxide or lauroyl peroxide; hydroperoxides such as cumene hydroperoxide; azo compounds such as azobisisobutyronitrile; and the like as a polymerization initiator.

The polycarboxylic acid for a cement dispersant thus obtained is used as a main component of the cement dispersant as it is. If necessary, it may be used by neutralizing a copolymer with an alkaline substance. Examples of such an alkaline substance are preferably inorganic salts, such as hydroxides, chlorides and carbonates of monovalent metals and divalent metals; ammonia; organic amines; and the like. In a case that maleic anhydride is used for copolymerization, the thus obtained copolymer may be directly used as a cement dispersant or may be hydrolized and then used.

The repeating unit of the polycarboxylic acid for a cement dispersant is within the range of, in weight ratio, (I)/(II)/(V)=1-99/99-1/0-50, preferably (I)/(II)/(V)=50-99/50-1/0-49, more preferably (I)/(II)/(V)=60-95/40-5/0-30, and most preferably (I)/(II)/(V)=70-95/30-5/0-10. Further, it is within the range of, in weight ratio, (III)/(IV)/(VI)=1-99/99-1/0-50, preferably (III)/(IV)/(VI) =50-99/50-1/0-49, more preferably (III)/(IV)/(VI)=60-95/40-5/0-30, and most preferably (III)/(IV)/(VI)=70-95/30-5/0-10. Further, the weight average molecular weight of the polycarboxylic acid for a cement dispersant is 5,000 to 200,000, and preferably 10,000 to 100,000. If those component ratios and weight average molecular weight are fallen outside the above ranges, a cement dispersant which exhibits high water reducing performance and slump loss preventing performance cannot be obtained.

A cement used is not limited, but hydraulic cements, such as ordinary portland cement, alumina cement and various mixed cements are general.

The polycarboxylic acid for a cement dispersant can be used alone or as mixtures thereof as a main component of the cement dispersant as it is or in the form of an aqueous solution, and may-be used in combination with other known cement admixtures. Examples of such cement admixtures are conventional cement dispersants, air-entraining agents, cement wetting agents, expanding materials, water-proof agents, retarding agents, accelerating agents, water-soluble polymeric substances, thickeners, coagulating agents, dry shrinkage reducing agents, strength increasing agents, cure accelerating agents, defoaming agents, and the like.

The cement composition of the present invention comprises at least water, a cement and a cement dispersant, wherein as the cement dispersant the cement composition comprises the polycarboxylic acid for a cement dispersant of the present invention. The polycarboxylic acid for a cement dispersant is added in an amount of 0.01 to 1.0%, and preferably 0.02 to 0.5%, of the cement weight in the cement composition. This addition brings about preferred various effects, such as reduction in unit water amount, increase in strength, or improvement in durability. If the amount used is less than 0.01%., it is insufficient in performance, and conversely, even it is used in an amount exceeding 1.0%, the effect is not substantially increased, which is disadvantageous from the economical standpoint.

Methods for producing the cement composition of the present invention are not especially limited and there can be exemplified the same manners as those for producing the conventional cement: compositions, such as a method that, when cement and water and other materials if necessary are mixed, the cement dispersant, its aqueous dispersion or aqueous solution is added to and mixed with them; a method that cement and water and other materials if necessary are mixed, and then the cement dispersant, its aqueous dispersion or aqueous solution is added to and mixed with the thus obtained mixture; a method that cement other materials if necessary are mixed, and then the cement dispersant, its aqueous dispersion or aqueous solution and water are added to and mixed with the thus obtained mixture; a method that cement and the cement dispersant, its aqueous dispersion or aqueous solution and other materials if necessary are mixed, and then water is added to and mixed with the thus obtained mixture.

In a case that the cement dispersant contains not only polycarboxylic acid but also a dispersant other than polycarboxylic acid, polycarboxylic acid and the other dispersant may be seperately added.

As embodiments of the cement composition, there can be exemplified cement water paste (cement water slurry), mortar or concrete. The cement water paste contains a cement, water and a cement dispersant as essential components. The mortar contains the same components as the cement water paste and further contains as an essential component a fine aggregate such as sand. The concrete contains the same components as the mortar and further contains as an essential component coarse aggregate such as cobble or crushed stone. (Effects and Advantages of the Invention)

Using as a cement dispersant the polycarboxylic acid for a cement dispersant produced according to the production method of the present invention can achieve high water reduction of a cement composition such as a concrete or a mortar.

DETAILED DESCRIPTION OF THE PREFERRED EMBODIMENTS

The present invention is explained below in more detail by the examples, but the present invention is not limited thereto. In the examples, unless otherwise indicated, "%" means "% by weight", and "part" means "part by weight" in the examples.

In the below-mentioned Examples 1–2 and Comparative Example 1, the molecular weight distribution were measured under the following conditions:

[Measurement of Molecular Weight Distribution]

| | |
|---|---|
| Apparatus | GPC HLC-8020 produced by TOSOH K.K. |
| Eluent | Kind: tetrahydrofuran |
| | Flow rate: 1.0 (ml/min) |
| Column | Kind: Product of TOSOH K.K. |
| | TSKgel G40000HXL + G3000HXL + G3000HXL + G2000HXL |
| | 7.8 mlI.D. × 300 ml respectively |
| Calibration curve: | Polystyrene standard molecular weight |

In Examples 4–6 and Comparative Examples 3–4, molecular weight distribution was measured on a basis converted into that of polyethylene glycol.

EXAMPLE 1

Production of Alkylene Oxide Adduct (1) of Unsaturated Alcohol Type Monomer (Polyalkylene Glycol Ether-based Monomer (1))

999 Parts of 3-methyl-3-butene-1-ol, and 5 parts of sodium hydride were charged into a stainless steel high pressure reactor equipped with a thermometer, a stirrer, and a nitrogen and oxygen introduction pipe. Inner atmosphere of the reactor was substituted with nitrogen under stirring, and was heated to 140° C. under nitrogen atmosphere. While maintaining 140° C. under safe pressure, 5,117 parts of ethylene oxide were introduced into the reactor for 5 hours. Thereafter, the temperature was maintained for 2 hours to complete alkylene oxide addition reaction, thereby obtaining an unsaturated alcohol (hereinafter referred to as "IPN-10") in which 10 moles, on the average, of ethylene oxide were added to 3-methyl-3-butene-1-ol. Subsequently, this reactor was cooled to 50° C., and after taking out 3,198 parts of IPN-10, the reactor was heated to 140° C. under nitrogen atmosphere. While maintaining 140° C. under a safe pressure, 6,302 parts of ethylene oxide were introduced into the reactor for 8 hours. The temperature was then maintained for 2 hours to complete alkylene oxide addition reaction, thereby obtaining an unsaturated alcohol (hereinafter referred to as "IPN-35") in which 35 moles, on the average, of ethylene oxide were added to 3-methyl-3-butene-1-ol. The area ratio of the shoulder-shaped peak on the higher molecular weight side of the main peak was 4.70%. The GPC chart is shown in FIG. 1.

EXAMPLE 2

(Production of Alkylene Oxide Adduct (2) of Unsaturated Alcohol Type Monomer (Polyalkylene Glycol Ether-based Monomer (2))

Figure 2:
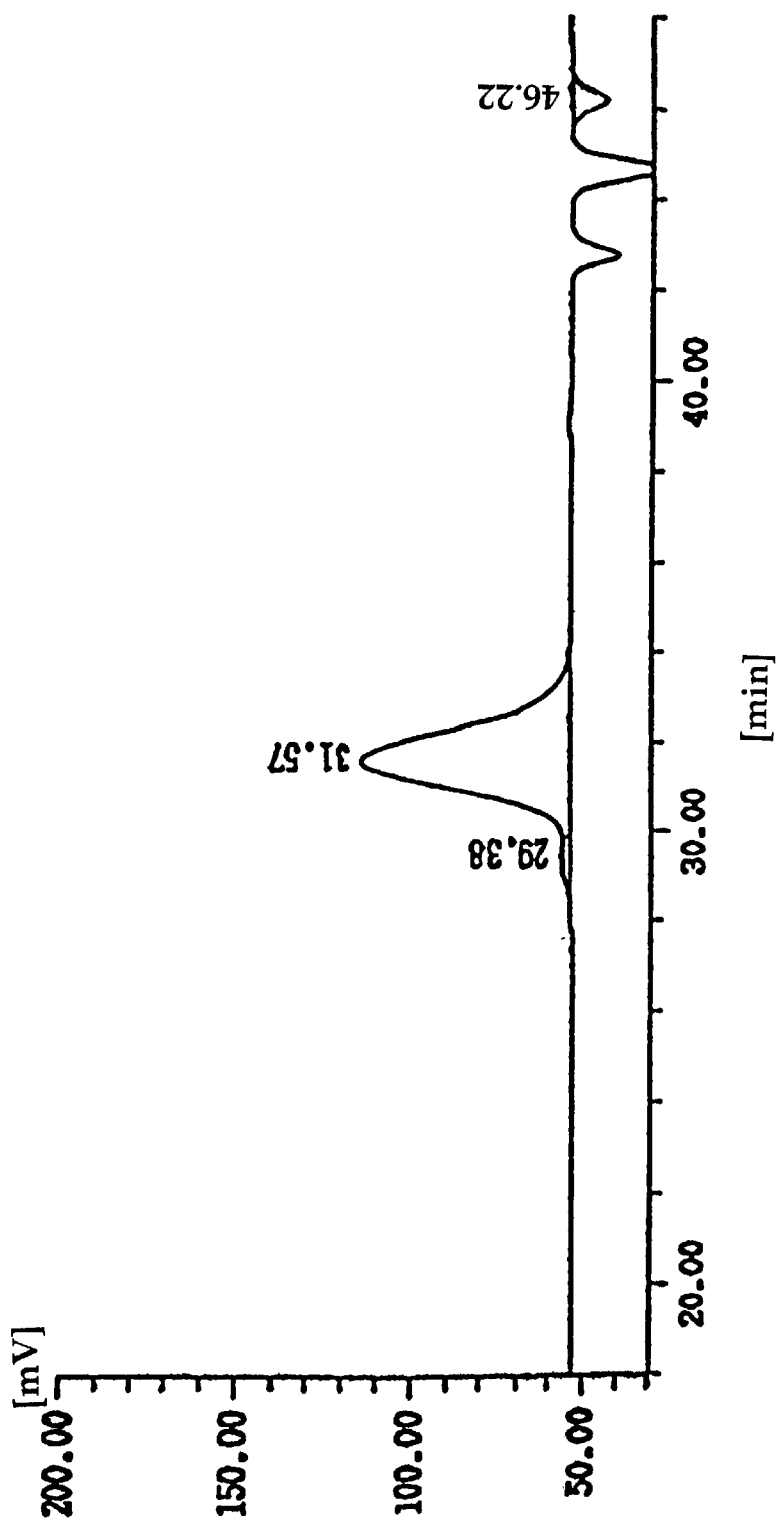
FIG. 2 shows a GPC chart of 'IPN-35' as produced in Example 2.

999 Parts of 3-methyl-3-butene-1-ol, and 5 parts of sodium hydride were charged into a stainless steel high pressure reactor equipped with a thermometer, a stirrer, and a nitrogen and oxygen introduction pipe. Inner atmosphere of the reactor was substituted with nitrogen under stirring, and was heated to 100° C. under nitrogen atmosphere. While maintaining 100° C. under safe pressure, 5,117 parts of ethylene oxide were introduced into the reactor for 8 hours. Thereafter, the temperature was maintained for 2.5 hours to complete alkylene oxide addition reaction, thereby obtaining an unsaturated alcohol (hereinafter referred to as "IPN-10") in which 10 moles, on the average, of ethylene oxide were added to 3-methyl-3-butene-1-ol. Subsequently, this reactor was cooled to 50° C., and after taking out 3,198 parts of IPN-10, the reactor was heated to 100° C. under nitrogen atmosphere. While maintaining 100° C. under a safe pressure, 6,302 parts of ethylene oxide were introduced into the reactor for 10 hours. The temperature was then maintained for 3 hours to complete alkylene oxide addition reaction, thereby obtaining an unsaturated alcohol (hereinafter referred to as "IPN-35") in which 35 moles, on the average, of ethylene oxide were added to 3-methyl-3-butene-1-ol. The area ratio of the shoulder-shaped peak on the higher molecular weight side of the main peak was 2.89%. The GPC chart is shown in FIG. 2.

COMPARATIVE EXAMPLE 1

Production of Alkylene Oxide Adduct (1) of Comparative Unsaturated Alcohol Type Monomer (Comparative Polyalkylene Glycol Ether-based Monomer (1))

999 Parts of 3-methyl-3-butene-1-ol, and 5 parts of sodium hydride were charged into a stainless steel high pressure reactor equipped with a thermometer, a stirrer, and an oxygen introduction pipe. Inner atmosphere of the reaction was substituted with nitrogen under stirring, and was heated to 160° C. under nitrogen atmosphere. While maintaining 160° C. under safe pressure, 5,117 parts of ethylene oxide were introduced into the reactor for 4 hours.

Figure 3:
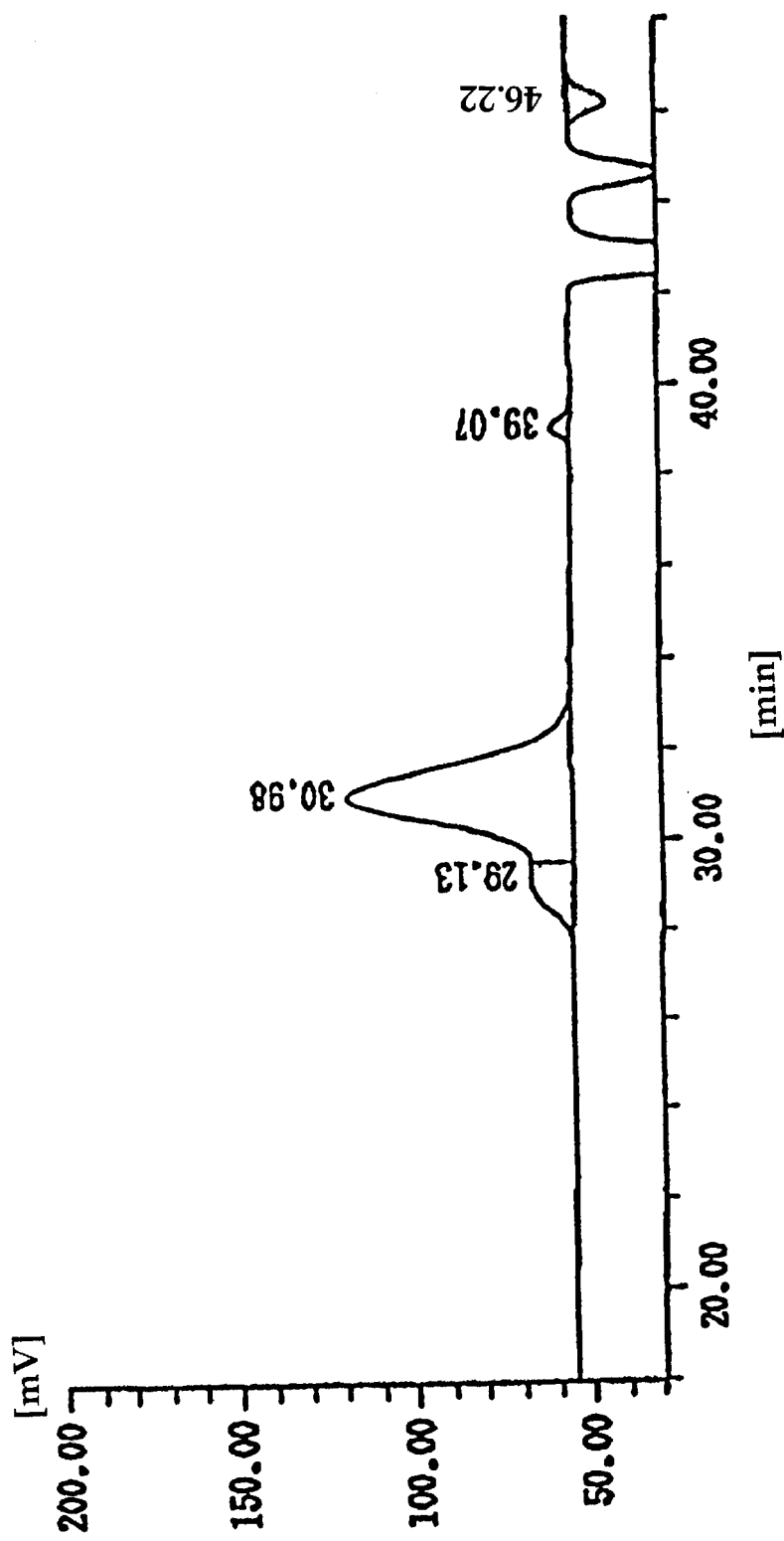
FIG. 3 shows a GPC chart of 'IPN-35' as produced in Comparative Example 1.

Thereafter, the temperature was maintained for 1 hours to complete alkylene oxide addition reaction, thereby obtaining an unsaturated alcohol (hereinafter referred to as "IPN-10") in which 10 moles, on the average, of ethylene oxide were added to 3-methyl-3-butene-1-ol. Subsequently, this reactor was cooled to 50° C., and after taking out 3,198 parts of IPN-10, the reactor was heated to 160° C. under nitrogen atmosphere. While maintaining 160° C. under a safe pressure, 6,302 parts of ethylene oxide were introduced into the reactor for 6 hours. The temperature was then maintained for 1 hours to complete alkylene oxide addition reaction, thereby obtaining an unsaturated alcohol (hereinafter referred to as "IPN-35") in which 35 moles, on the average, of ethylene oxide were added to 3-methyl-3-butene-1-ol. The area ratio of the shoulder-shaped peak on the higher molecular weight side of the main peak was 11.86%. The GPC chart is shown in FIG. 3.

EXAMPLE 3

Production of Methacrylic Ester (1) of Polyalkylene Glycol (Polyalkylene Glycol Ester-based Monomer (1))

8.2 Parts of methanol, and 0.2 parts of sodium hydroxide were charged into a stainless steel high pressure reactor equipped with a thermometer, a stirrer, and a nitrogen and oxygen introduction pipe. Inner atmosphere of the reactor was substituted with nitrogen under stirring, and was heated to 120° C. under nitrogen atmosphere. While maintaining 120° C. under safe pressure, 116.6 parts of ethylene oxide were introduced into the reactor for 1 hour. Thereafter, the temperature was maintained for 1 hour to complete alkylene oxide addition reaction, thereby obtaining an alcohol in which 3 moles, on the average, of ethylene oxide were added to methanol. Subsequently, the reactor was heated to 155° C. and 855 parts of ethylene oxide were introduced into the reactor for 3 hours under a safe pressure. The temperature was then maintained for 1 hours to complete alkylene oxide addition reaction, thereby obtaining methoxypolyethylene glycol (hereinafter referred to as "PGM-25") in which 25 moles, on the average, of ethylene oxide were added to methanol.

Methacrylic ester of methoxypolyethylene glycol (methoxypolyethylene glycol monomethacrylate) was obtained by esterification between the PGM-25 and methacrylic acid in a common manner.

COMPARATIVE EXAMPLE 2

Production of Comparative Methacrylic Ester (1) of Polyalkylene Glycol (Comparative Polyalkylene Glycol Ester-based Monomer (1))

8.2 Parts of methanol, and 0.2 parts of sodium hydroxide were charged into a stainless steel high pressure reactor equipped with a thermometer, a stirrer, and a nitrogen and oxygen introduction pipe. Inner atmosphere of the reactor was substituted with nitrogen under stirring, and was heated to 120° C. under nitrogen atmosphere. While maintaining 120° C. under safe pressure, 116.6 parts of ethylene oxide were introduced into the reactor for 1 hour. Thereafter, the temperature was maintained for 1 hour to complete alkylene oxide addition reaction, thereby obtaining an alcohol in which 3 moles, on the average, of ethylene oxide were added to methanol. Subsequently, the reactor was heated to 170° C. and 855 parts of ethylene oxide were introduced into the reactor for 3 hours under a safe pressure. The temperature was then maintained for 1 hours to complete alkylene oxide addition reaction, thereby obtaining methoxypolyethylene glycol (hereinafter referred to as "PGM-25") in which 25 moles, on the average, of ethylene oxide were added to methanol.

Methacrylic ester of methoxypolyethylene glycol (methoxypolyethylene glycol monomethacrylate) was obtained by esterification between the PGM-25 and methacrylic acid in a common manner.

EXAMPLE 4

Production of Polycarboxylic Acid (1) for Cement Dispersant

50 Parts of the unsaturated alcohol (hereinafter referred to as "IPN-35"), in which 35 moles, on the average, of ethylene oxide were added to 3-methyl-3-butene-1-ol, as produced in Example 1, 6.4 parts of maleic acid, and 24.2 parts of water were charged in a glass reactor equipped with a thermometer, a stirrer, a dropping funnel, a nitrogen introduction pipe, and a reflux condenser, and the charged materials were heated to 60° C. under stirring. 14.3 Parts of 6% ammonium persulfate aqueous solution were added dropwise for 3 hours. Thereafter, the temperature was maintained for 1 hour to complete copolymerization reaction, and 30% NaOH aqueous solution was added dropwise to neutralize up to pH of 7.0 to obtain a polycarboxylic acid (1) for a cement dispersant, comprising a copolymer aqueous solution having a weight average molecular weight of 33,400, of the present invention.

EXAMPLE 5

Production of Polycarboxylic Acid (2) for Cement Dispersant

50 Parts of the unsaturated alcohol (hereinafter referred to as "IPN-35") in which 35 moles, on the average, of ethylene oxide were added to 3-methyl-3-butene-1-ol, as produced in Example 2, 6.4 parts of maleic acid, and 24.2 parts of water were charged in a glass reactor equipped with a thermometer, a stirrer, a dropping funnel, a nitrogen introduction pipe, and a reflux condenser, and the charged materials were heated to 60° C. under stirring. 14.3 Parts of 6% ammonium persulfate aqueous solution were added dropwise for 3 hours. Thereafter, the temperature was maintained for 1 hour to complete copolymerization reaction, and 30% NaOH aqueous solution was added dropwise to neutralize up to pH of 7.0 to obtain a polycarboxylic acid (2) for a cement dispersant, comprising a copolymer aqueous solution having a weight average molecular weight of 45,500, of the present invention.

COMPARATIVE EXAMPLE 3

Production of Comparative Polycarboxylic Acid (1) for Cement Dispersant

50 Parts of the unsaturated alcohol (hereinafter referred to as "IPN-35") in which 35 moles, on the average, of ethylene oxide were added to 3-methyl-3-butene-1-ol, as produced in Comparative Example 1, 6.4 parts of maleic acid, and 24.2 parts of water were charged in a glass reactor equipped with a thermometer, a stirrer, a dropping funnel, a nitrogen introduction pipe, and a reflux condenser, and the charged materials were heated to 60° C. under stirring. 14.3 Parts of 6% ammonium persulfate aqueous solution were added to dropwise for 3 hours. Thereafter, the temperature was maintained for 1 hour to complete copolymerization reaction, and 30% NaOH aqueous solution was added dropwise to neutralize up to pH of 7.0 to obtain a comparative polycarboxylic acid (1) for a cement dispersant, comprising a copolymer aqueous solution having a weight average molecular weight of 15,300.

EXAMPLE 6

Production of Polycarboxylic Acid (3) for Cement Dispersant

120 Parts of water were charged into a glass reactor equipped with a thermometer, a stirrer, a dropping funnel, a nitrogen introduction pipe, and a reflux condenser. Inner atmosphere of the reactor was substituted with nitrogen under stirring, and was heated to 80° C. under nitrogen atmosphere. Monomer aqueous solution and 24 parts of 2.3% ammonium persulfate aqueous solution were added dropwise for 4 hours, wherein the monomer aqueous solution was a mixture of 50 parts of methoxypolyethylene glycol monomethacrylate as produced in Example 3, 10 parts of methacrylic acid, 0.5 parts of mercaptopropionic acid and 90 parts of water. After the dropping was finished, further, 6 parts of 2.3% ammonium persulfate aqueous solution were added dropwise for 1 hour. Thereafter, subsequently, the temperature 80° C. was maintained to complete polymerization reaction, thereby obtaining a polycarboxylic acid (3) for a cement dispersant, comprising a copolymer aqueous solution having a weight average molecular weight of 20,000, of the present invention.

COMPARATIVE EXAMPLE 4

Production of Comparative Polycarboxylic Acid (2) for Cement Dispersant

120 Parts of water were charged into a glass reactor equipped with a thermometer, a stirrer, a dropping funnel, a nitrogen introduction pipe, and a reflux condenser. Inner atmosphere of the reactor was substituted with nitrogen under stirring, and was heated to 80° C. under nitrogen atmosphere. Monomer aqueous solution and 24 parts of 2.3% ammonium persulfate aqueous solution were added dropwise for 4 hours, wherein the monomer aqueous solution was a mixture of 50 parts of methoxypolyethylene glycol monomethacrylate as produced in Comparative Example 2, 10 parts of methacrylic acid, 0.5 parts of mercaptopropionic acid and 90 parts of water. After the dropping was finished, further, 6 parts of 2.3% ammonium persulfate aqueous solution were added dropwise for 1 hour. Thereafter, subsequently, the temperature 80° C. was maintained to complete polymerization reaction, thereby obtaining a comparative polycarboxylic acid (2) for a cement dispersant, comprising a copolymer aqueous solution having a weight average molecular weight of 20,000.

EXAMPLES 7 TO 9, AND COMPARATIVE EXAMPLES 5 to 6

Mortar Test

Mortar test was conducted using the polycarboxylic acids (1), (2) and (3) for a cement dispersant of the present invention, and the comparative polycarboxylic acids (1) and (2) for a cement.

Blending proportions of materials and mortar used in the test were 400 g of ordinary Portland cement (Chichibu-Onoda Cement Corporation), 800 g of standard sand (Toyoura), and 260 g of water containing various polymers.

Mortar was prepared with mechanical kneading by a mortar mixer, and mortar was packed in a hollow cylinder having a diameter of 55 mm, and height of 55 mm. Next, after lifting up the cylinder vertically, a diameter of mortar spread on a table was measured in two directions, and the average was used as a flow value. The results are shown in Tables 1 and 2.

TABLE 1

|  | Polycarboxylic acid for cement dispersant used | Rate of polymerization (%) | | Weight average molecular weight | Addition amounts (wt %)[b] | Flow Value (mm) |
| --- | --- | --- | --- | --- | --- | --- |
|  |  | IPN-35[a] | Maleic acid |  |  |  |
| Example 7 | Polycarboxylic acid (1) for cement dispersant | 77.8 | 98.9 | 33400 | 0.11 | 95 |
| Example 8 | Polycarboxylic acid (2) for cement dispersant | 79.8 | 99.9 | 45500 | 0.11 | 97 |
| Comparative Example 5 | Comparative polycarboxylic acid (1) for cement dispersant | 56.7 | 72.0 | 15300 | 0.13 | 97 |

[a]35 Moles of EO (ethyleneoxide) were added to 3-methyl-3-butene-1-ol
[b]Weight % of solid content to cement From Table 1, Rates of polymerization of maleic acid and IPN-35 are 72% and 56.7% in the comparative polycarboxylic acid for a cement dispersant, whereas those are very high as 98.9% and 77.8% in the polycarboxylic acid (1) for a cement dispersant of the present invention, and 99.9% and 79.8% in the polycarboxylic acid (2) of a cement dispersant of the present invention. Therefore, the cement dispersant of the present invention decreases its addition amount as compared with the comparative cement dispersant, and can be highly polymerized up to a molecular weight suitable as a cement dispersant. As a result, it is apparent that water reducing property is improved.

TABLE 2

| | Polycarboxylic acid for cement dispersant used | Weight average molecular weight | Addition amounts (wt %) | Flow Value (mm) |
|---|---|---|---|---|
| Example 9 | Polycarboxylic acid (3) for cement dispersant | 20,000 | 0.13 | 109 |
| Comparative Example 6 | Comparative Polycarboxylic acid (2) for cement dispersant | 20,000 | 0.13 | 103 |

From Table 2, it is understood that the cement dispersant (3) has a higher mortar flow value and superior dispersibility as compared with the comparative cement dispersant (2) at the same amount added (0.13%). Therefore, the cement dispersant of the present invention decreases its addition amount as compared with the comparative cement dispersant, and increases water reducing performance

What is claimed is:

1. A method for producing a polycarboxylic acid for a cement dispersion, wherein the polycarboxylic acid includes a polyalkylene glycol ester unit (III), a monocarboxylic acid unit (IV) and optionally, a repeating unit (VI), said polyalkylene glycol ester unit (III) being represented by the general formula (4) below:

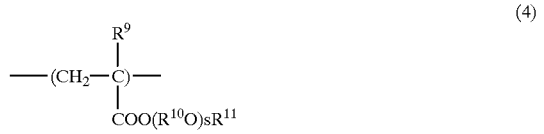
(4)

where: $R^9$ represents hydrogen or methyl group; $R^{10}O$ represents one kind or a mixture of two or more kinds of oxyalkylene group having 2 to 4 carbon atoms, in the case of two or more kinds, those may be added in a block state or random state; $R^{11}$ represents an alkyl group having 1 to 22 carbon atoms, phenyl group, or alkylphenyl group, with the alkyl group in the alkylphenyl group having 1 to 22 carbon atoms; and s is an integer of 5 to 100;

said polyalkylene glycol ester unit (III) being given from a polyalkylene glycol ester monomer, said polyalkylene glycol ester monomer being obtained by esterification between a polyalkylene glycol (6) represented by the general formula (6) below and (meth)acrylic acid or ester interchange between the polyalkylene glycol (6) and alkyl(meth)acrylate, with the alkyl group in the alkyl(meth)acrylate having 1 to 22 carbon atoms,

(6)

where: $R^{10}O$ represents one kind or a mixture of two or more kinds of oxyalkylene group having 2 to 4 carbon atoms, in the case of two or more, those may be added in a block state or random state; $R^{11}$ represents an alkyl group having 1 to 22 carbon atoms, phenyl group, or alkylphenyl group, with the alkyl group in the alkylphenyl group having 1 to 22 carbon atoms; and s is an integer of 5 to 100; and said polyalkylene glycol (6) being obtained by an addition reaction of alkylene oxide having 2 to 4 carbon atoms in the range of 80 to 155° C., said monocarboxylic acid unit (IV) represented by the general formula (5) below:

(5)

where: $R^{12}$ represents hydrogen or methyl group: and $M^3$ represents hydrogen, monovalent metal, divalent metal, ammonium, or organic amine, said repeating unit (VI) being other than the polyalkylene glycol ester unit (III) and the monocarboxylic acid unit (IV), and the weight ratio of the polyalkylene glycol ester unit (III)/the monocarboxylic acid unit (IV)/the repeating unit (VI) being in the range of 60-95/40-5/0-30.

2. A method for producing a polycarboxylic acid for a cement dispersion according to claim 1, wherein the polyalkylene glycol (6) is obtained by an addition reaction of alkylene oxide having 2 to 4 carbon atoms in the range of 80 to 155° C. with an alcohol (B-2) represented by the general formula (7) below:

(7)

where $R^{11}$ represents an alkyl group having 1 to 22 carbon atoms, phenyl group, or alkylphenyl group, with the alkyl group in the alkylphenyl group having 1 to 22 carbon atoms.

3. A method for producing a polycarboxylic acid for a cement dispersion according to claim 1, wherein the addition reaction of alkylene oxide is carried out in the presence of a base catalyst.

* * * * *